US009456018B2

(12) United States Patent
Iyer

(10) Patent No.: US 9,456,018 B2
(45) Date of Patent: Sep. 27, 2016

(54) HTTP PROXY BASED CAPTIVE PORTAL
(75) Inventor: Pradeep Iyer, Cupertino, CA (US)
(73) Assignee: Aruba Networks, Inc., Sunnyvale, CA (US)
(*) Notice: Subject to any disclaimer, the term of this patent is extended or adjusted under 35 U.S.C. 154(b) by 257 days.
(21) Appl. No.: 12/976,700
(22) Filed: Dec. 22, 2010
(65) Prior Publication Data
US 2012/0166662 A1    Jun. 28, 2012

(51) Int. Cl.
*G06F 15/16* (2006.01)
*H04L 29/08* (2006.01)
*H04L 12/14* (2006.01)
*H04L 29/06* (2006.01)

(52) U.S. Cl.
CPC ............. *H04L 67/02* (2013.01); *H04L 63/164* (2013.01); *H04L 67/2814* (2013.01); *H04L 12/1403* (2013.01); *H04L 63/08* (2013.01)

(58) Field of Classification Search
CPC .. H04L 67/02; H04L 67/2814; H04L 63/164
USPC .................... 709/229, 225, 226; 370/254
See application file for complete search history.

(56) References Cited

U.S. PATENT DOCUMENTS

| | | | |
|---|---|---|---|
| 6,931,530 B2 * | 8/2005 | Pham et al. ................. 713/165 |
| 7,359,933 B1 * | 4/2008 | Polen ...................... H04L 67/34 709/203 |
| 7,542,468 B1 * | 6/2009 | Begley et al. ................. 370/389 |
| 7,562,147 B1 * | 7/2009 | Cohen ...................... H04L 67/02 709/228 |
| 7,665,130 B2 * | 2/2010 | Johnston et al. ............... 726/12 |
| 8,856,869 B1 * | 10/2014 | Brinskelle ................ H04L 63/08 726/12 |
| 9,332,090 B1 * | 5/2016 | Fallows .................. H04L 69/04 |
| 2002/0066036 A1 * | 5/2002 | Makineni et al. ............. 713/201 |
| 2002/0099829 A1 * | 7/2002 | Richards ........... G06F 17/30899 709/227 |
| 2003/0061355 A1 * | 3/2003 | Yang ....................... H04L 67/02 709/227 |
| 2003/0135585 A1 * | 7/2003 | Binder .................... H04L 29/06 709/219 |
| 2004/0098515 A1 * | 5/2004 | Rezvani et al. ............... 709/400 |
| 2005/0114531 A1 * | 5/2005 | Kadyk et al. ................. 709/229 |
| 2006/0031407 A1 * | 2/2006 | Dispensa et al. ............. 709/219 |
| 2006/0056317 A1 * | 3/2006 | Manning et al. ............. 370/254 |
| 2006/0072620 A1 * | 4/2006 | Chatterjee ............. H04L 67/322 370/477 |
| 2008/0059575 A1 * | 3/2008 | Malobrodsky et al. ...... 709/203 |
| 2008/0319857 A1 * | 12/2008 | Dobbins et al. ................ 705/14 |
| 2009/0112674 A1 * | 4/2009 | Musso et al. .................... 705/8 |
| 2009/0288104 A1 * | 11/2009 | Bagepalli ................ H04L 63/10 719/328 |
| 2010/0106562 A1 * | 4/2010 | Taylor et al. .................. 705/10 |
| 2010/0198938 A1 * | 8/2010 | Molland ........... H04L 29/08846 709/217 |
| 2010/0281107 A1 * | 11/2010 | Fallows .................... G06F 9/54 709/203 |
| 2010/0306059 A1 * | 12/2010 | Rettig et al. ................ 705/14.58 |
| 2010/0306112 A1 * | 12/2010 | Tseng .............................. 705/51 |
| 2012/0204241 A1 * | 8/2012 | Varsavsky Waisman-Diamond et al. ................................ 726/5 |

* cited by examiner

*Primary Examiner* — Khaled Kassim
*Assistant Examiner* — Syed S Ali
(74) *Attorney, Agent, or Firm* — Brooks, Cameron & Huebsch, PLLC

(57) ABSTRACT

HTTP-Based Captive Portal. Client requests through a device such as an access point or wired connection are routed through a captive portal switch (CPS). If the CPS determines that the client has not been authenticated, the CPS redirects (NATs) the client request to an internal HTTP proxy. The CPS HTTP proxy terminates the client request and opens a connection to a captive portal server. Thus, for an unauthenticated client, any HTTP request will be routed to the captive portal server. When client authentication at the captive portal server completes, the captive portal server returns a success code, such as embedded in a web page delivered to the client. When the CPS recognizes this success code, it disables the NAT for that client, allowing further requests to be passed through the network. The CPS may be hosted in a separate network appliance, or it may be a process hosted in the AP or on another AP in the network, or on a network device such as a controller or switch.

3 Claims, 1 Drawing Sheet

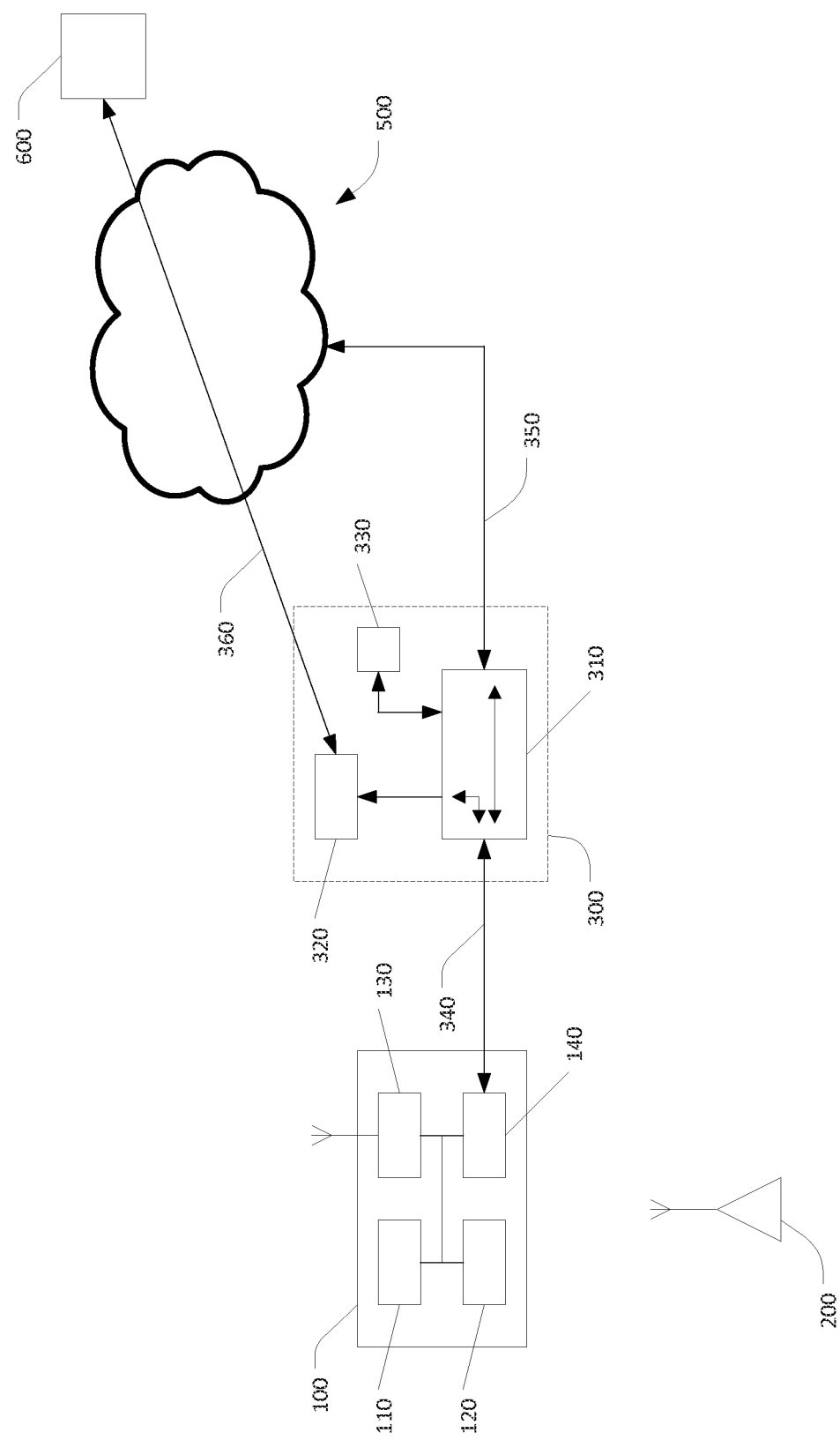

HTTP PROXY BASED CAPTIVE PORTAL

BACKGROUND OF THE INVENTION

The present invention relates to digital networks, and in particular, to the problem of captive portals on networks.

Internet access, wired and particularly wireless, is becoming ubiquitous and expected. People have come to expect Internet access wherever they go. Many businesses have realized that providing Internet access to customers may be monetized, either indirectly in bringing in or retaining customers, or directly by providing Internet access for a fee.

A Captive Portal (CP) provides a mechanism to control Internet access. When a new user attempts to connect to the Internet such as through a wireless connection, that connection attempt is sent to a Captive Portal, which typically presents information and an agreement for the user to accept, possibly facilitating payment for the service. When authentication through the Captive Portal is complete, the user is allowed access to the Internet.

An example of a captive portal is provided by U.S. Pat. No. 6,636,894 to Short, et al.

What is needed is a way to way of operating a captive portal.

BRIEF DESCRIPTION OF THE DRAWINGS

The invention may be best understood by referring to the following description and accompanying drawings that are used to illustrate embodiments of the invention in which:

FIG. 1 shows devices in a network using a captive portal switch.

DETAILED DESCRIPTION

Embodiments of the invention relate to methods of controlling network access through the use of a captive portal switch.

According to the present invention, a client device connects to the Internet through an edge connection such as an access point (AP) or a wired switch. The AP or wired switch passes all traffic (the request) through a Captive Portal Switch (CPS). The CPS recognizes that the user is new (unathenticated). The CPS redirects (NATs) the client request to a transparent HTTP Proxy in the CPS, which terminates the client connection at the CPS. The transparent HTTP Proxy establishes a separate connection to a Captive Portal, effectively routing the client connection request to the Captive Portal via the HTTP proxy. When the authentication process with the Captive Portal is successfully completed, the Captive Portal returns a success code which is recognized by the CPS, which cancels the NAT applied to the client device. The next client request therefore passes directly to the Internet.

The CPS may be a separate device connected to the network such as a network appliance, or may be a process hosted in an AP or another network device such as a controller, or another AP or other network device such as a router or switch.

FIG. 1 shows a network in which access point (AP) 100 is a purpose-made digital device containing a processor 110, memory hierarchy 120, and input-output interfaces 130. In one embodiment of the invention, a MIPS-class processor such as those from Cavium or RMI is used. Other suitable processors, such as those from Acorn, Intel, or AMD may also be used. The memory hierarchy 120 traditionally comprises fast read/write memory for holding processor data and instructions while operating, and nonvolatile memory such as EEPROM and/or Flash for storing files and system startup information. Wired interfaces 140 are typically IEEE 802.3 Ethernet interfaces, used for wired connections to other network devices such as switches, or to a controller. Wireless interfaces 130 may be WiMAX, 3G, 4G, and/or IEEE 802.11 wireless interfaces. In one embodiment of the invention, APs operate under control of a LINUX operating system, with purpose-built programs providing access point functionality. Access point 100 provides access to network 500, which may be a private intranet or the public Internet.

According to the invention, traffic from AP 100 or other network device such as a wired switch passes through Captive Portal Switch (CPS) 300 before passing to network 500.

As is understood in the art, other network devices such as switches and routers may be present between CPS 300 and network 500. CPS 300 contains switch/recognizer 310, HTTP proxy 320, and may optionally contain a local database 330. CPS 300 may be present in the form of a standalone appliance, in which case CPS 300 will contain at least a CPU for executing instructions, a memory hierarchy for containing instructions and data, and input/output interfaces such as IEEE 802.3 Ethernet interfaces and/or IEEE 802.11 WiFi interfaces. The processes which comprise CPS 300 may be present in a separate appliance such as a box connected via Ethernet to a router or switch, or the processes comprising CPS 300 may be present in a suitable network device, such as AP 100, or a network switch or router.

Wireless client 200 has a similar architecture containing at least a CPU, memory hierarchy, display, and input/output devices, chiefly differing in input/output devices; a laptop computer will usually contain a large LCD, while a handheld wireless scanner will typically have a much smaller display, but contain a laser barcode scanner.

According to the present invention, a client such as client 200 associates with the network, such as through AP 100. All communications between client 200 and network 500 run through captive portal switch (CPS) 300. Assume the client has not authenticated with Captive Portal 600. When client 200 sends a TCP request such as "HTTP GET twitter.com: 80" this request is passed by AP 100 to CPS 300.

Captive portal switch 300 cannot identify client 100 as already authorized. CPS 300 may do this, for example, by looking up the MAC address of client 200 in a list or local database 330 of authorized clients, or by querying captive portal 600. If client 200 is not authorized, CPS 300 redirects 310 the request of client 200 to transparent HTTP proxy 320.

HTTP proxy 320 terminates the connection from client 200 and opens a new connection 360 to Captive Portal 600. Optionally this connection may be encrypted. Through the use of HTTP Proxy 320, client 200's request, for example to twitter.com, is instead sent to captive portal 600.

When processing by captive portal 600 is successfully completed, captive portal 600 returns a success code which is recognized by captive portal switch 310.

The processing by captive portal 600 may be simply acceptance of terms of use by the client, or may involve authentication, or may include financial transactions such as providing access to a form of payment in exchange for network access. This information is optionally retained by captive portal 600.

The success code returned by captive portal 600 may be any code recognizable by CPS 300. Examples include but are not limited to text included within a success page returned by captive portal 600 indicating success to client 320. The code in such a case may be text visible to the user of client 200, or may not be visible, such as text placed in a tag within an HTML page. Such text may be a simple keyword, or may be cryptographically related to client 200.

Optionally, authorization data for client 200 may be stored in local CPS database 330. This authorization may optionally contain limits, such as time limits or geographic limits.

Once the success code has been received by CPS 300, redirection of requests by client 200 is cancelled, and further requests from client 200 will be sent 350 to network 500.

While captive portal 600 is shown as a separate entity attached to network 500, captive portal 600 may be a process resident in AP 100, CPS 300, or on another suitable device accessible by AP 100 such as another AP. As an example, a simple captive portal application may be constructed using the open source web server application Apache extended with php scripts as is known to the art.

As previously discussed, captive portal switch 300 may be a physically separate appliance, or it may be a process running on AP 100, another AP in the network, or on any suitable device in the network such as a controller or switch.

Communications paths 340, 350, 360 of FIG. 1 are logical connections as understood in the art. In an embodiment such as one where CPS 300 is embedded in a standalone network appliance such as a Captive Portal appliance, paths 340, 350, and 360 may be routed through the same physical wired Ethernet connection, or if desired, an Ethernet port may be used for appliance input path 340 and a separate Ethernet port used for the combination of paths 350 and 360.

The present invention may be realized in hardware, software, or a combination of hardware and software. The present invention may be realized in a centralized fashion in one computer system such as AP 100, or in a distributed fashion where different elements are spread across several interconnected computer systems. A typical combination of hardware and software may be an access point with a computer program that, when being loaded and executed, controls the device such that it carries out the methods described herein.

The present invention also may be embedded in nontransitory fashion in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention may be embodied in other forms without departing from the spirit or essential attributes thereof. Accordingly, reference should be made to the following claims, rather than to the foregoing specification, as indicating the scope of the invention.

I claim:

1. A computer-implemented method, comprising:
receiving, at a computing device, a first request for data from a client device via a first connection, wherein the requested data is located on the Internet;
determining whether the client device is authorized to access the Internet;
in response to a determination that the client device is not authorized to access the Internet, terminating the first connection between the computing device and the client device and establishing a second connection between the computing device and a captive portal to send the first request for data received from the client device to the captive portal;
redirecting, by the computing device, the first request for data to the captive portal via the second connection;
receiving, by the computing device, a success message from the captive portal authorizing the client device to access the Internet, wherein the success message indicates that the client device has been authenticated, wherein:
the client device is authenticated when the client device is associated with an agreement for Internet access wherein the agreement includes agreeing to payment in exchange for Internet access;
authentication includes authorization to access the Internet for a limited time and within a geographic area;
in response to receiving the success message, cancelling redirection of requests for data from the client device to the captive portal; and
directing a second request for data from the client device to a network, wherein communication between the client device and the network is run through the captive portal switch.

2. A network device, comprising:
one or more processors;
a non-transitory computer-readable medium containing instructions that, when executed by the one or more processors, cause the one or more processor to:
receive a first request for data from a client device via a first connection, wherein the requested data is located on the Internet;
determine whether the client device is authorized to access the Internet;
in response to a determination that the client device is not authorized to access the Internet, terminate the first connection between the network device and the client device and establish a second connection between the network device and a captive portal to send the request for data received from the client device to the captive portal;
redirect the first request for data to the captive portal via the second connection;
receive a success message from the captive portal authorizing the client device to access the Internet, wherein the success message indicates that the client device has been authenticated, wherein:
the client device is authenticated when the client device is associated with an agreement for Internet access that includes agreeing to terms of use, wherein the agreement includes agreeing to payment in exchange for Internet access;
authentication includes authorization to access the Internet for a limited time and within a geographic area;
in response to receiving the success message, cancel redirection of requests for data from the client device to the captive portal; and
directing a second request for data from the client device to a network, wherein communication between the client device and the network is run through the captive portal switch.

3. A computer-program product tangibly embodied in a non-transitory machine-readable storage medium of a network device, including instructions that, when executed by one or more processors, cause the one or more processors to:

receive a first request for data from a client device via a first connection, wherein the requested data is located on the Internet;

identify the client device, wherein identifying includes determining whether the client device is authorized to access the Internet;

in response to a determination that the client device is not authorized to access the Internet, terminate the first connection between the network device and the client device and establish a second connection between the network device and a captive portal to send the first request for data received from the client device to the captive portal;

redirect the first request for data to the captive portal via the second connection;

receive a success message from the captive portal authorizing the client device to access the Internet, wherein the success message indicates that the client device has been authenticated, wherein:

the client device is authenticated when the client device is associated with an agreement for Internet access that includes agreeing to terms of use, wherein the agreement includes agreeing to payment in exchange for Internet access;

authentication includes authorization to access the Internet for a limited time and within a geographic area;

in response to receiving the success message, cancel redirection of requests for data from the client device to the captive portal; and direct a second request for data from the client device to a network, wherein communication between the client device and the network is run through the captive portal switch.

* * * * *